United States Patent
Ichikawa et al.

(10) Patent No.: US 7,940,805 B2
(45) Date of Patent: May 10, 2011

(54) RECEIVING DEVICE, CLOCK SYNCHRONIZING METHOD, AND COMPUTER PROGRAM

(75) Inventors: Takahiro Ichikawa, Saitama (JP); Koji Obata, Tokyo (JP); Tomoyuki Sato, Kanagawa (JP); Yoshikatsu Niwa, Kanagawa (JP); Junichi Otani, Tokyo (JP); Tomoaki Takemura, Tokyo (JP); Shinya Masunaga, Tokyo (JP)

(73) Assignee: Sony Corporation (JP)

( * ) Notice: Subject to any disclaimer, the term of this patent is extended or adjusted under 35 U.S.C. 154(b) by 100 days.

(21) Appl. No.: 12/381,749

(22) Filed: Mar. 16, 2009

(65) Prior Publication Data

US 2009/0245124 A1 Oct. 1, 2009

(30) Foreign Application Priority Data

Mar. 17, 2008 (JP) ................. P2008-068256

(51) Int. Cl.
*H04J 3/06* (2006.01)
(52) U.S. Cl. ..................... 370/503; 370/508
(58) Field of Classification Search .................. 370/503
See application file for complete search history.

(56) References Cited

U.S. PATENT DOCUMENTS

| 7,039,070 B2 * | 5/2006 | Kawakatsu | 370/503 |
| 2005/0180511 A1 * | 8/2005 | Arafune et al. | 375/240.28 |
| 2008/0145020 A1 * | 6/2008 | Tsuruga | 386/65 |
| 2010/0027962 A1 * | 2/2010 | Okamoto et al. | 386/65 |

FOREIGN PATENT DOCUMENTS

| JP | 2000-332802 A | 11/2000 |
| JP | 2005-151434 A | 6/2005 |

* cited by examiner

*Primary Examiner* — Kwang B Yao
*Assistant Examiner* — Syed M Bokhari
(74) *Attorney, Agent, or Firm* — Lerner, David, Littenberg, Krumholz & Mentlik, LLP

(57) ABSTRACT

There is provided a receiving device including: a receiving unit that receives a packet stream; an oscillator; a measuring unit that performs a measuring operation; an acquiring unit that reads the newest time stamp read from the packet stream received by the receiving unit and the newest measurement value measured by the measuring unit with a predetermined period, from a point of time when the packet stream starts to be received; a calculating unit that calculates an accumulation value of the time stamps and the measurement values acquired by the acquiring unit; a comparing unit that compares a difference between the accumulation value of the time stamps and the accumulation value of the measurement values calculated by the calculating unit, and a value corresponding to a network jitter; and a frequency control unit that controls the oscillation frequency of the oscillator based on the comparison result by the comparing unit.

7 Claims, 12 Drawing Sheets

RECEIVING DEVICE, CLOCK SYNCHRONIZING METHOD, AND COMPUTER PROGRAM

The present application claims priority from Japanese Patent Application No. JP 2008-068256, filed in the Japanese Patent Office on Mar. 17, 2008, the entire content of which is incorporated herein by reference.

BACKGROUND OF THE INVENTION

1. Field of the Invention

The present invention relates to a receiving device, a clock synchronizing method, and a computer program, and more particularly, to a receiving device, a clock synchronizing method, and a computer program that can stably reproduce data received through a network.

2. Description of the Related Art

In recent years, services that transmit and provide audio data or video data through communication media, such as the Internet, have been widely provided. As an example of a transmission method of the audio data or the video data, with an increase in a communication speed or a network bandwidth, a transmission method of a streaming scheme that reproduces audio or video based on received data while keeping parallel with reception of data has been widely used.

When the streaming scheme is used to receive the audio data or the video data, stabilize the audio data or the video data, and reproduce the audio data or the video data, a signal process clock in a transmitting device needs to be synchronized with a signal process clock in a receiving device. Accordingly, when the audio data or the video data is stabilized and reproduced, it is needed to control a frequency of the signal process clock in the receiving device.

For example, the receiving device that uses the streaming scheme to receive the audio data or the video data and reproduce the audio data or the video data has been disclosed in Japanese Patent Application Laid-Open No. 2005-151434. JP-A No. 2005-151434 discloses a technique for receiving a packet stream where predetermined units each having a time stamp and a TS (Transport Stream) packet are continuous using a network I/F, outputting each TS packet to a demultiplexer using the time stamp included in the received packet stream, and performing clock control using a PCR (Program Clock Reference). The receiving device that is disclosed in JP-A No. 2005-151434 assumes flow control at a transmission side and a reception side. In the receiving device, if stream supply is appropriately performed, an overflow or an underflow of a buffer is not generated, and the received audio data or video data can be stabilized and decoded.

SUMMARY OF THE INVENTION

According to the technique that is disclosed in JP-A No. 2005-151434, if the stream supply is appropriately performed, the overflow or the underflow of the buffer is not generated, and the received audio data or video data can be stabilized and decoded. Meanwhile, in a system that does not perform flow control at an RTP/UDP transmission, when a difference is generated between a clock at the transmission side and a clock at the reception side, if a buffer having a predetermined capacity is prepared at the reception side, the audio data or the video data can be stabilized and decoded, until the overflow or the underflow is generated in the buffer.

However, when the difference between the clock at the transmission side and the clock at the reception side increases, time until the overflow or the underflow is generated in the buffer decreases, which result in decreasing time in which the audio data or the video data can be stabilized and decoded. Further, if the overflow or the underflow is generated in the buffer and an omission is generated in the received data, it may not possible to normally decode the received data. Accordingly, in order to stably perform a decoding operation over a long period of time, a clock control operation needs to be performed so as to remove the difference between the clocks at the transmission side and the reception side.

As a technique for synchronizing the clocks at the transmission side and the reception side, for example, there is a technique that is disclosed in JP-A No. 2000-332802. JP-A No. 2000-332802 discloses the technique for adding time information at the moment when a packet is transmitted at the transmission side to the packet and synchronizing clocks at the transmission side and the reception side. That is, according to the technique that is disclosed in JP-A No. 2000-332802, it is assumed that a time stamp of a header of an RTP is used. However, the technique that is disclosed in JP-A No. 2000-332802 is systematically different from the technique that is disclosed in JP-A No. 2005-151434 and processes a packet stream where predetermined units each having a time stamp and a TS packet are continuous. In addition, the technique that is disclosed in JP-A No. 2000-332802 is not be applied to the technique that is disclosed in JP-A No. 2005-151434.

In addition, a relatively large jitter can be generated in the audio data or the video data that is received through a network based on the streaming scheme. Accordingly, it may not possible to perform clock control using an arrival time of a TS packet and a PCR in a stream. Since a packet loss can be generated in the video data or the audio data received through the network, it is needed to stably control a clock without being affected by the network jitter or the packet loss.

Accordingly, the present invention addresses the above-identified and other issues associated with conventional methods and apparatuses. There is a need for a receiving device, a clock synchronizing method, and a computer program that can perform stable clock control over a long period of time without being affected by a network jitter or a packet loss even in a receiving system that does not perform flow control.

According to an embodiment of the present invention, there is provided a receiving device. The receiving device includes a receiving unit that receives a packet stream where predetermined units each having at least a time stamp and a TS (Transport Stream) packet are continuous; an oscillator that can control an oscillation frequency; a measuring unit that divides a clock supplied by the oscillator and performs a measuring operation; an acquiring unit that reads the newest time stamp read from the packet stream received by the receiving unit and the newest measurement value measured by the measuring unit with a predetermined period, from a point of time when the packet stream starts to be received; a calculating unit that calculates an accumulation value of the time stamps acquired by the acquiring unit and an accumulation value of the measurement values acquired by the acquiring unit; a comparing unit that compares an absolute value of a difference between the accumulation value of the time stamps calculated by the calculating unit and the accumulation value of the measurement values calculated by the calculating unit, and a value corresponding to a network jitter; and a frequency control unit that controls the oscillation frequency of the oscillator, when the absolute value of the difference between the accumulation value of the time stamps and the accumulation value of the measurement values is larger than the value corresponding to the network jitter as the comparison result by the comparing unit.

According to this configuration, the oscillator can control an oscillation frequency, and the measuring unit divides a clock supplied by the oscillator and performs a measuring operation. Further, the receiving unit receives a packet stream where predetermined units each having at least a time stamp and a TS packet are continuous, and the acquiring unit reads the newest time stamp read from the packet stream received by the receiving unit and the newest measurement value measured by the measuring unit with a predetermined period, from a point of time when the packet stream starts to be received. Further, the calculating unit calculates an accumulation value of the time stamps acquired by the acquiring unit and an accumulation value of the measurement values acquired by the acquiring unit, and the comparing unit compares an absolute value of a difference between the accumulation value of the time stamps calculated by the calculating unit and the accumulation value of the measurement values calculated by the calculating unit, and a value corresponding to a network jitter. Further, the frequency control unit controls the oscillation frequency of the oscillator, when the absolute value of the difference between the accumulation value of the time stamps and the accumulation value of the measurement values is larger than the value corresponding to the network jitter as the comparison result by the comparing unit. As a result, even in a receiving system that does not perform flow control, a frequency can be controlled based on the time stamps read from the packet stream and the measurement values measured from the point of time when the reception starts. Accordingly, stable clock control can be performed over a long period of time without being affected by the network jitter or the packet loss.

The frequency control unit may control the oscillation frequency of the oscillator using a ratio between a time until the absolute value and the value are compared with each other from a point of time when the receiving unit starts to receive the packet stream, and a difference of the time stamp and the measurement value.

The receiving device may further include a reproducing unit that decodes and reproduces the TS packet, which is included in the packet stream received by the receiving unit, in synchronization with the clock that is controlled by the frequency control unit and supplied from the oscillator.

The calculating unit may compare the newest time stamp that the acquiring unit reads from the packet stream received by the receiving unit and the time stamp read immediately previously by the acquiring unit, and may use the immediately previously read time stamp for calculating the accumulation value, when the immediately previously read time stamp is smaller than the newest time stamp.

When the newest time stamp read by the acquiring unit has the same value over a predetermined number of times, the frequency control unit may not control the oscillation frequency.

The acquiring unit may read the newest time stamp read from the packet stream received by the receiving unit when interrupt of a vertical synchronous signal is received and the newest measurement value measured by the measuring unit.

When the comparing unit determines that the absolute value of the difference between the accumulation value of the time stamps and the accumulation value of the measurement values is larger than the value corresponding to the network jitter, the frequency control unit may first control the oscillation frequency of the oscillator, when either the accumulation value of the time stamps or the accumulation value of the measurement values is continuously large over the predetermined number of times.

According to another embodiment of the present invention, there is provided a clock synchronizing method. The clock synchronizing method includes the steps of: receiving a packet stream where predetermined units each having at least a time stamp and a TS (Transport Stream) packet are continuous; supplying a clock having a controllable oscillation frequency; dividing the supplied clock and performing a measuring operation; reading the newest time stamp read from the received packet stream and the measured newest measurement value with a predetermined period, from a point of time when the packet stream starts to be received; calculating an accumulation value of the acquired time stamps and an accumulation value of the acquired measurement values; comparing an absolute value of a difference between the calculated accumulation value of the time stamps and the calculated accumulation value of the measurement values, and a value corresponding to a network jitter; and controlling the oscillation frequency of the supplied clock, when the absolute value of the difference between the accumulation value of the time stamps and the accumulation value of the measurement values is larger than the value corresponding to the network jitter as the comparison result.

According to this configuration, the receiving step receives a packet stream where predetermined units each having at least a time stamp and a TS packet are continuous, the clock supply step supplies a clock having a controllable oscillation frequency, and the measuring step divides the clock supplied by the clock supplying step and performs a measuring operation. Further, the acquiring step reads the newest time stamp read from the packet stream received by the receiving step and the newest measurement value measured by the measuring step with a predetermined period, from a point of time when the packet stream starts to be received, and the calculating step calculates an accumulation value of the time stamps acquired by the acquiring step and an accumulation value of the measurement values acquired by the acquiring step. Further, the comparing step compares an absolute value of a difference between the accumulation value of the time stamps calculated by the calculating step and the accumulation value of the measurement values calculated by the calculating step, and a value corresponding to a network jitter, and the frequency control step controls the oscillation frequency of the clock supplied by the clock supply step, when the absolute value of the difference between the accumulation value of the time stamps and the accumulation value of the measurement values is larger than the value corresponding to the network jitter as the comparison result by the comparing step. As a result, even in a receiving system that does not perform flow control, a frequency can be controlled based on the time stamps read from the packet stream and the measurement values measured from the point of time when the reception starts. Accordingly, stable clock control can be performed over a long period of time without being affected by the network jitter or the packet loss.

According to another embodiment of the present invention, there is provided a computer program. The computer program allows a computer to execute processes including the steps of: receiving a packet stream where predetermined units each having at least a time stamp and a TS (Transport Stream) packet are continuous; supplying a clock having a controllable oscillation frequency; dividing the supplied clock and performing a measuring operation; reading the newest time stamp read from the received packet stream and the measured newest measurement value with a predetermined period, from a point of time when the packet stream starts to be received; calculating an accumulation value of the acquired time stamps and an accumulation value of the acquired measurement values; comparing an absolute value of a difference between the calculated accumulation value of the time stamps and the calculated accumulation value of the measurement values, and a value corresponding to a network jitter; and controlling the oscillation frequency of the supplied clock, when the absolute value of the difference between the accumulation value of the time stamps and the accumulation value of the measurement values is larger than the value corresponding to the network jitter as the comparison result.

According to this configuration, the receiving step receives a packet stream where predetermined units each having at least a time stamp and a TS packet are continuous, the clock supply step supplies a clock having a controllable oscillation frequency, and the measuring step divides the clock supplied by the clock supplying step and performs a measuring operation. Further, the acquiring step reads the newest time stamp read from the packet stream received by the receiving step and the newest measurement value measured by the measuring step with a predetermined period, from a point of time when the packet stream starts to be received, and the calculating step calculates an accumulation value of the time stamps acquired by the acquiring step and an accumulation value of the measurement values acquired by the acquiring step. Further, the comparing step compares an absolute value of a difference between the accumulation value of the time stamps calculated by the calculating step and the accumulation value of the measurement values calculated by the calculating step, and a value corresponding to a network jitter, and the frequency control step controls the oscillation frequency of the clock supplied by the clock supply step, when the absolute value of the difference between the accumulation value of the time stamps and the accumulation value of the measurement values is larger than the value corresponding to the network jitter as the comparison result by the comparing step. As a result, even in a receiving system that does not perform flow control, a frequency can be controlled based on the time stamps read from the packet stream and the measurement values measured from the point of time when the reception starts. Accordingly, stable clock control can be performed over a long period of time without being affected by the network jitter or the packet loss.

According to the embodiments of the present invention described above, it is possible to provide a new and improved receiving device, a clock synchronizing method, and a computer program that can perform stable clock control over a long period of time without being affected by the network jitter or the packet loss, by controlling a frequency based on the time stamp read from the packet stream and the measurement values measured from a point of time when the reception starts, even in a receiving system that does not perform flow control.

DETAILED DESCRIPTION OF EMBODIMENT

Figure 1:
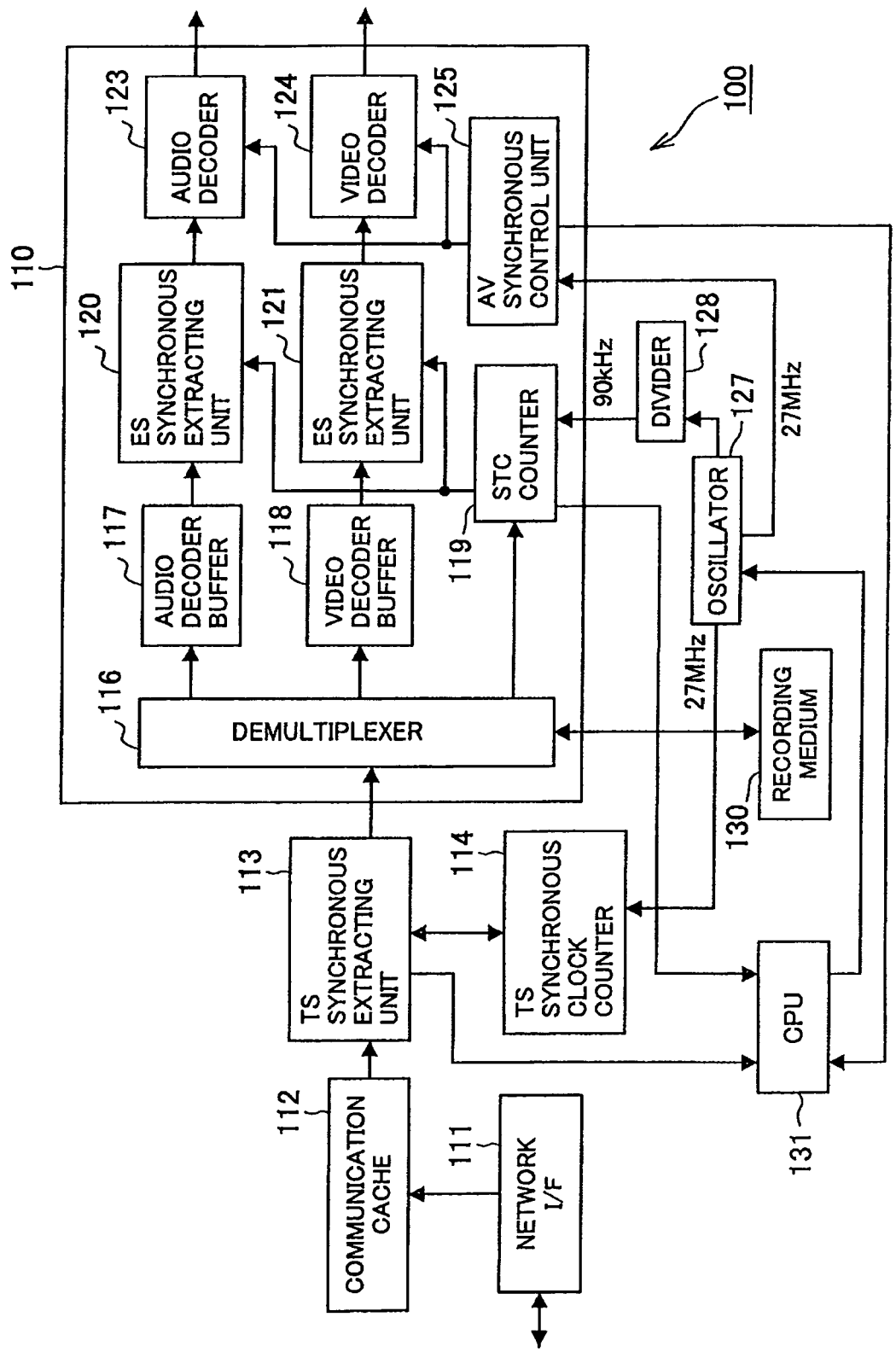
FIG. 1 is a diagram illustrating the configuration of a receiving device 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First, the configuration of a receiving device according to an embodiment of the present invention will be described. FIG. 1 is a diagram illustrating the configuration of a receiving device 100 according to an embodiment of the present invention. Hereinafter, the configuration of the receiving device 100 according to the embodiment of the present invention will be described using FIG. 1.

As shown in FIG. 1, the receiving device 100 according to the embodiment of the present invention includes a reproducing unit 110, a network I/F 111, a communication cache 112, a TS synchronous extracting unit 113, a TS synchronous clock counter 114, an oscillator 127, a divider 128, a recording medium 130, and a CPU 131.

The reproducing unit 110 decodes video data or audio data that is received by the receiving device 100 and reproduces the video data or the audio data. The reproducing unit 110 includes a demultiplexer 116, an audio decoder buffer 117, a video decoder buffer 118, an STC counter 119, ES synchronous extracting units 120 and 121, an audio decoder 123, a video decoder 124, and an AV synchronous control unit 125.

The network I/F 111 is a communication interface with a variety of external networks, such as the Internet. For example, the network I/F 111 may be an LAN (Local Area Network) card, an ADSL (Asymmetric Digital Subscriber Line) modem, or an ONU (Optical Network Unit) for an FTTH (Fiber To The Home). Although not shown in FIG. 1, the network I/F 111 is connected to a content server where a stream resource (packet stream where video data or audio data is packetized) is stored, through the variety of external networks, such as the Internet.

The network I/F 111 performs communication using an HTTP (HyperText Transport Protocol) or a TCP/IP (Transmission Control Protocol/Internet Protocol). Data that is received by the network I/F 111 is transmitted to the communication cache 112.

Figure 2:
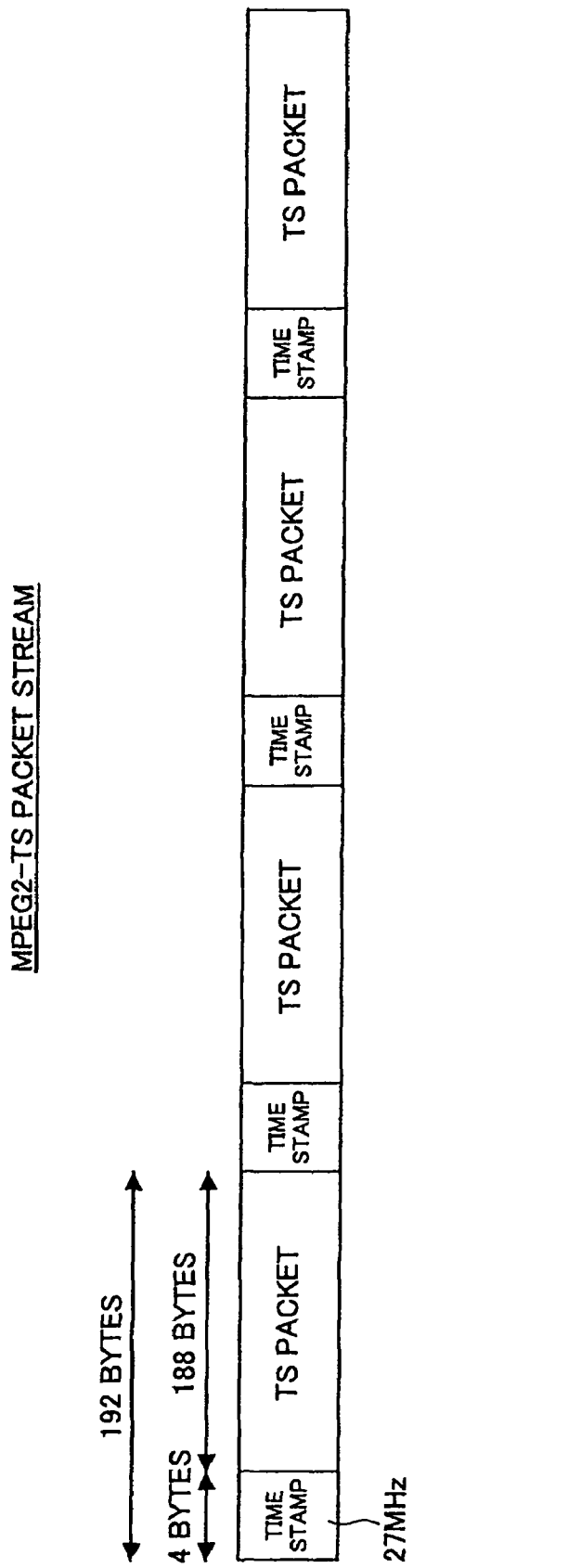
FIG. 2 is a diagram illustrating a TTS packet.

In this case, the stream resource that the network I/F 111 supplies to the communication cache 112 is a time stamp added TS packet (TTS packet) that is shown in FIG. 2. The TTS packet is a packet where a time stamp of 4 bytes is added to a TS packet of 188 bytes and a packet length is 192 bytes. In the TTS packet that is shown in FIG. 2, the time stamp of 4 bytes is a time stamp that has precision of 27 MHz. A stream where the TTS packets are continuous is called an MPEG2-TS packet stream.

The communication cache 112 temporarily stores (caches) the stream resource that is received by the network I/F 111. The stream resource that is temporarily stored in the communication cache 112 is supplied to the TS synchronous extracting unit 113. When the stream resource is supplied from the communication cache 112 to the TS synchronous extracting unit 113, the stream resource is supplied in a unit of one TTS packet (LTTS packet).

If the communication cache 112 supplies the stream resource to the TS synchronous extracting unit 113 and the amount of the stream resource that is stored in the communication cache 112 decreases, the stream resource is appropriately supplied from the network I/F 111 to the communication cache. Preferably, the communication cache 112 has a capacity that is capable of storing the stream resource, such that a delay (for example, reproduction time of about 30 seconds) due to routing or retransmission when the stream resource is transmitted from the content server to the receiving device 100 can be sufficiently absorbed.

The TS synchronous extracting unit 113 stores the TTS packet that is supplied from the communication cache 112, and controls an output of the stored TTS packet to the demultiplexer 116, based on a count value that is supplied from the TS synchronous clock counter 114. When the TTS packet that is supplied from the communication cache 112 is a head packet of the stream resource, the TS synchronous extracting unit 113 supplies a value of a time stamp (time stamp value) of the TTS packet to the TS synchronous clock counter 114, extracts a packet where the time stamp is removed from the TTS packet, and supplies the packet to the demultiplexer. In addition, when the TTS packet that is supplied from the communication cache 112 is a packet other than the head packet of the stream resource, the TS synchronous extracting unit 113 determines whether the time stamp value of the TTS packet is the same as the time stamp value supplied from the TS synchronous clock counter 114. If the time stamp value of the TTS packet is the same as the time stamp value supplied from the TS synchronous clock counter 114, the TS synchronous extracting unit 113 extracts a packet where the time stamp is removed from the TTS packet and supplies the packet to the demultiplexer.

In addition, if the TS packet that is included in the TTS packet that the TS synchronous extracting unit 113 stores is output to the demultiplexer 116, a next TTS packet is supplied from the communication cache 112 to the TS synchronous extracting unit 113.

In addition, the time stamp value that is added to the TTS packet that the TS synchronous extracting unit 113 stores is read by the CPU 131, and is used for clock frequency control in the CPU 131.

The TS synchronous clock counter 114 sets the time stamp value supplied from the TS synchronous extracting unit 113 as an initial value, and stores a time stamp value that is counted up by a clock that is supplied from the oscillator 127 and has a frequency of 27 MHz. The count value of the TS synchronous clock counter 114 is supplied to the TS synchronous extracting unit 113.

The demultiplexer 116 separates (filters) the TS packet, which is supplied from the TS synchronous extracting unit 113 and stores video data, audio data, and a PCR, into the video data, the audio data, the PCR, and the other data. If the data is separated by the demultiplexer 116, the audio data is supplied to the audio decoder buffer 117 and the video data is supplied to the video decoder buffer 118, and upper 33 bits of the PCR that are stored in the first PCR packet of the stream resource are supplied to the STC counter 119.

Although not shown in FIG. 1, in the case where a user operates an operation unit to operate the receiving device 100 and performs an instruction operation such that the video data or the audio data (stream resource that is received through the network I/F 111) received by the receiving device 100 is recorded in the recording medium 130, the demultiplexer 116 supplies the data, which is supplied from the TS synchronous extracting unit 113, to the recording medium 130.

The audio decoder buffer 117 temporarily accumulates the audio data that is supplied from the demultiplexer 116. The audio data that is accumulated in the audio decoder buffer 117 is stored as a PES packet in the audio decoder buffer 117. The audio decoder buffer 117 supplies only the stored PES packet or a header portion of the PES packet to the ES synchronous extracting unit 120.

The video decoder buffer 118 temporarily accumulates the video data that is supplied from the demultiplexer 116. The video data that is accumulated in the video decoder buffer 118 is stored as the PES packet in the video decoder buffer 118. The video decoder buffer 118 supplies only the stored PES packet or the head portion of the PES packet to the ES synchronous extracting unit 121.

The STC counter 119 sets the upper 33 bits of the PCR, which are supplied from the demultiplexer 116 and stored in the first PCR packet of the stream resource, as an initial value, and stores an STC counter value that is counted up by a clock that is supplied from the divider 128 and has a frequency of 90 kHz. The count value of the STC counter 119 is supplied to the ES synchronous extracting units 120 and 121.

In addition, the count value of the STC counter 119 is read by the CPU 131 and used for clock frequency control in the CPU 131.

The ES synchronous extracting unit 120 receives the PES packet from the audio decoder buffer 117 and extracts the header portion of the PES packet of the audio data that is stored in the audio decoder buffer 117. In addition, the ES synchronous extracting unit 120 controls supply of the audio data stored in the audio decoder buffer 117 to the audio decoder 123, based on the STC counter value that is supplied from the STC counter 119. That is, when the PTS value that is described in the header portion of the PES packet becomes the same as the STC counter value that is supplied from the STC counter 119, the ES synchronous extracting unit 120 extracts the PES packet having the header portion of the extracted PES packet from the audio decoder buffer 117, and supplies the PES packet to the audio decoder 123.

The ES synchronous extracting unit 121 receives the PES packet from the video decoder buffer 118, and extracts the header portion of the PES packet of the video data that is stored in the video decoder buffer 118. In addition, the ES synchronous extracting unit 121 controls supply of the video data stored in the video decoder buffer 118 to the video decoder 124, based on the STC counter value that is supplied from the STC counter 119. That is, when the PTS value that is described in the header portion of the PES packet becomes the same value as the STC counter value that is supplied from the STC counter 119, the ES synchronous extracting unit 121 extracts the PES packet having the header portion of the extracted PES packet from the video decoder buffer 118, and supplies the PES packet to the video decoder 124.

The audio decoder 123 decodes the audio data of the PES packet that is supplied from the ES synchronous extracting unit 120. The decoded audio data is output as audio from an audio output device (not shown), such as a speaker, in accordance with the clock that is supplied from the AV synchronous control unit 125 and has the frequency of 27 MHz.

The video decoder 124 decodes the video data of the PES packet that is supplied from the ES synchronous extracting unit 121. The decoded video data is output as video from a display device (not shown) in accordance with the clock that is supplied from the AV synchronous control unit 125 and has the frequency of 27 MHz. Examples of the display device may include a CRT (Cathode Ray Tube) display, a plasma display, a liquid crystal display, and an organic EL display.

Based on the clock that is supplied from the oscillator 127 and has the frequency of 27 MHz, the AV synchronous control unit 125 supplies the clock having the frequency of 27 MHz, which is used to synchronize the video data and the audio data, to the audio decoder 123 and the video decoder 124.

The oscillator 127 generates the clock that has the frequency of 27 MHz and supplies the generated clock to the divider 128, the TS synchronous clock counter 114, and the AV synchronous control unit 125. The oscillator 127 can be configured by using, for example, a VCXO (Voltage Controlled Xtal Oscillator). The VCXO is a quartz oscillator that can change a frequency using a voltage. The control of the voltage to the VCXO can be performed by supplying a PWM (Pulse Width Modulation) signal to the VCXO through a low pass filter. An oscillation frequency of the VCXO can be controlled by controlling the PWM signal. Further, a range where the oscillation frequency of the oscillator 127 can be changed is preferably a range that can cover a variation range of a clock frequency in a transmitting device.

The divider 128 divides the clock having the frequency of 27 MHz, which is supplied from the oscillator 127, into 1/300 frequencies and generates clocks having frequencies of 90 KHz. The clocks that are generated by the divider 128 and have the frequencies of 90 KHz are supplied to the STC counter 119.

The recording medium 130 is composed of a magnetic disk such as a hard disk, an optical disk such as a CD-R, a DVD-R, and a Blu-ray disk, a magneto-optical disk such as an MD, or a semiconductor memory. The recording medium 130 may previously store a computer program to control the receiving device 100. The recording medium 130 stores the video data or the audio data supplied from the demultiplexer 116, under the control from the CPU 131. Further, the recording medium 130 supplies the video data or the audio data stored in the recording medium 130 to the demultiplexer 116, under the control from the CPU 131.

The CPU 131 controls the individual components of the receiving device 100. The control of the individual components of the receiving device 100 by the CPU 131 may be performed by reading the computer programs stored in the recording medium 130 and sequentially executing the read computer programs.

In this embodiment, the CPU 131 acquires the time stamp value from the TS synchronous extracting unit 113 and the STC counter value from the STC counter 119 with a predetermined period, and controls the oscillation frequency of the oscillator 127 based on the acquired values. The predetermined period may be a period during which interrupt of the V. Sync (vertical synchronous signal) from the AV synchronous control unit 125 is performed. A method that controls the oscillation frequency of the oscillator 127 in the CPU 131 will be described in detail below.

As shown in FIG. 1, if the receiving device 100 is configured, the video data and the audio data can be separated from the stream resource that is transmitted from the content server through the network I/F 111. The video data and the audio data can be synchronized with each other, and can be reproduced.

In addition, the CPU 131 acquires the time stamp value from the TS synchronous extracting unit 113 and the STC counter value from the STC counter 119 with a predetermined period, and controls the oscillation frequency of the oscillator 127 based on the acquired values. If the oscillation frequency of the oscillator 127 is controlled, the CPU 131 can control the oscillation frequency of the oscillator 127 and stabilize the video data or the audio data transmitted from the content server over a long time to decode the video data or the audio data, thereby reproducing the video data and the audio data.

The configuration of the receiving device 100 according to the embodiment of the present invention has been described using FIG. 1. Next, the outline of the clock synchronous process in the receiving device 100 according to the embodiment of the present invention will be described.

Figure 3:
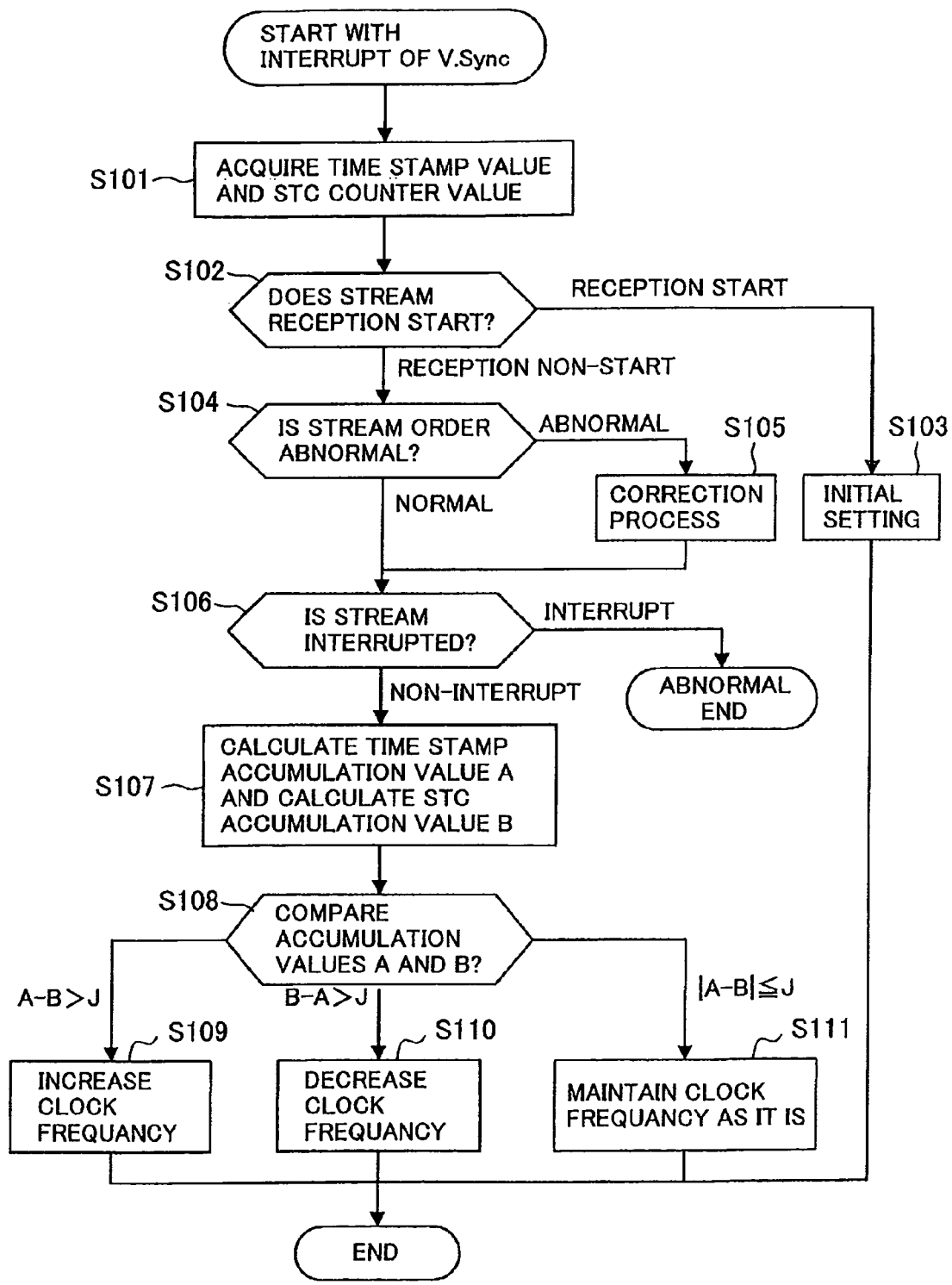
FIG. 3 is a flowchart illustrating the outline of a clock synchronous process in a receiving device 100 according to an embodiment of the present invention.

FIG. 3 is a flowchart illustrating the outline of a clock synchronous process in a receiving device 100 according to an embodiment of the present invention. Hereinafter, the outline of the clock synchronous process in the receiving device 100 according to the embodiment of the present invention will be described using FIG. 3.

The clock synchronous process in the receiving device 100 according to the embodiment of the present invention starts when the interrupt of the V. Sync (vertical synchronous signal) from the AV synchronous control unit 125 to the CPU 131 is executed with the predetermined period. If the CPU 131 receives the interrupt of V. Sync from the AV synchronous control unit 125, the CPU 131 acquires the newest time stamp value from the TS synchronous extracting unit 113 and the newest STC counter value from the STC counter 119 (Step S101).

Next, the CPU 131 determines whether reception of a packet stream starts (Step S102). The reception start of the packet stream means that a power supply device of the receiving device 100 is turned on or the reception of the new stream starts by a channel switching operation using an operation unit (not shown). When the reception of the packet stream starts, the CPU 131 performs initial setting that is related to a clock synchronous process in the receiving device 100 (Step S103), and completes a process. Meanwhile, when the reception of the packet stream does not start, the CPU executes a stream order determining process to determine whether the packets stream correctly arrives at the receiving device 100 (Step S104).

When the stream order determining process is executed, the CPU 131 compares the time stamp value that is acquired from the TS synchronous extracting unit 113 in the immediately previous clock synchronous process and the time stamp value that is acquired from the TS synchronous extracting unit 113 in Step S101. If the time stamp value that is acquired from the TS synchronous extracting unit 113 in Step S101 is smaller than the time stamp value that is acquired from the TS synchronous extracting unit, the CPU determines that a packet arrival order to the receiving device 100 is abnormal, and executes a correction process (Step S105). The correction process will be described in detail below. Meanwhile, if the time stamp value that is acquired from the TS synchronous extracting unit 113 is not smaller than the time stamp value that is acquired from the TS synchronous extracting unit, the CPU determines that the packet arrival order to the receiving device 100 is normal, and skips the correction process of Step S105.

Next, the CPU 131 executes a stream interrupt determining process to determine whether the packet stream arriving at the receiving device 100 is interrupted (Step S106). During the stream interrupt determining process, when the time stamp value that is acquired from the TS synchronous extracting unit 113 during the immediately previous clock synchronous process is compared with the time stamp value that is acquired from the TS synchronous extracting unit 113 in Step S101 and the two values are equal to each other with the predetermined time or more, the CPU determines that the packet stream is interrupted. In addition, if the CPU 131 determines that the packet stream is interrupted, the CPU 131 abnormally completes the clock synchronous process in the receiving device 100.

Figure 4:
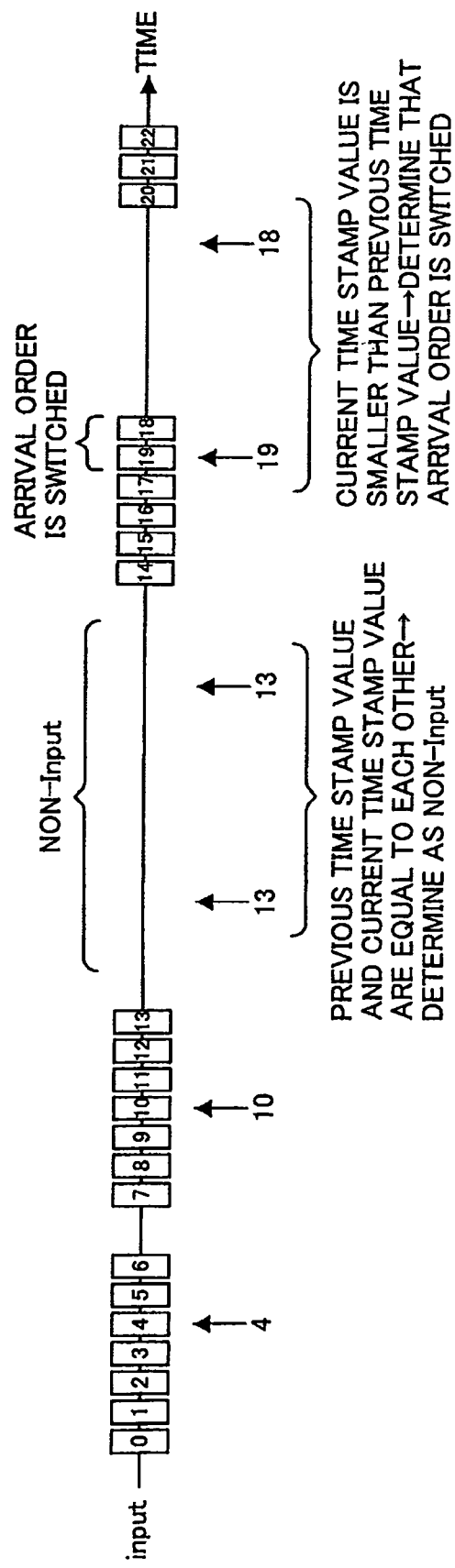
FIG. 4 is a diagram illustrating the outline of stream order determination and stream interrupt determination.

FIG. 4 is a diagram illustrating the outline of stream order determination and stream interrupt determination using a time stamp value that is stored in a TTS synchronous extracting unit 113 in a receiving device 100 according to an embodiment of the present invention. The TTS synchronous extracting unit 113 stores a time stamp value that is described in a TTS packet that is supplied from a communication cache 112. In addition, the CPU 131 acquires the time stamp value that is stored in the TTS synchronous extracting unit 113 with a predetermined period.

In the example that is shown in FIG. 4, a third acquired time stamp value and a fourth acquired time stamp value are the same as "13". Accordingly, at this time, the CPU determines that the packet stream does not arrive at the receiving device 100. As such, when the acquired time stamp values are equal to each other with the predetermined time or more, the CPU determines that the packet stream is interrupted during the stream interrupt determination process.

In addition, in the example that is shown in FIG. 4, a largeness and a smallness relationship between a fifth acquired time stamp value and a sixth acquired time stamp value is inverted. This is because, after the fifth time stamp value of "19" is acquired, a time stamp value of the TTS packet supplied to the TTS synchronous extracting unit 113 is "18". In this case, in the stream order determining process, the CPU determines that the packet arrival order to the receiving device 100 is abnormal, and executes a correction process.

If the stream order determining process and the stream interrupt determining process are completed, the CPU 131 calculates an accumulation value A of the time stamp values and an accumulation value B of the STC counter values, which are acquired in Step S101 (Step S107). Each of the accumulation value A of the time stamp values and the accumulation value B of the STC counter values is calculated by adding a difference between the time stamp value and the STC counter value, which are acquired during the immediately previous clock synchronous process.

If the CPU 131 calculates the accumulation value A of the time stamp values and the accumulation value B of the STC counter values acquired in Step S101, the CPU 131 compares the accumulation values A and B (Step S108). In addition, the CPU 131 controls the oscillation frequency of the oscillator 127 in accordance with a difference between the accumulation values A and B.

When the accumulation values A and B are compared with each other, in a state where an amount corresponding to a network jitter (network jitter amount) J is used as a threshold value, if an absolute value of a difference between the accumulation values A and B is larger than the network jitter amount J, the CPU 131 controls the oscillation frequency of the oscillator 127. When the condition A−B>J is satisfied, that is, when a value obtained by subtracting the accumulation value A of the time stamp values by the accumulation value B of the STC counter values is larger than the network jitter amount J, the time stamp value of the TTS packet in the packet stream that the receiving device 100 has received precedes the STC counter value. Thus, the CPU 131 controls the oscillation frequency of the oscillator 127 such that the oscillation frequency is increased (Step S109). When the condition B−A>J is satisfied, that is, when a value obtained by subtracting the accumulation value B of the STC counter values by the accumulation value A of the time stamp values is larger than the network jitter amount J, the STC counter value precedes the time stamp value of the TTS packet in the packet stream that the receiving device 100 has received. Thus, the CPU 131 controls the oscillation frequency of the oscillator 127 such that the oscillation frequency is decreased (Step S110). When the condition |A−B|≦J is satisfied, the CPU 131 does not control the oscillation frequency of the oscillator 127 (Step S111).

When the accumulation values A and B are compared in step S108, if the absolute value of the difference between the accumulation values A and B is larger than the network jitter amount J, the CPU 131 may not control the oscillation frequency of the oscillator 127 until the determination process is continuously executed by a predetermined number of times.

The outline of the clock synchronous process in the receiving device 100 according to the embodiment of the present invention has been described using FIG. 3. Next, the clock synchronous process in the receiving device 100 according to the embodiment of the present invention will be described in detail below.

Figure 5:
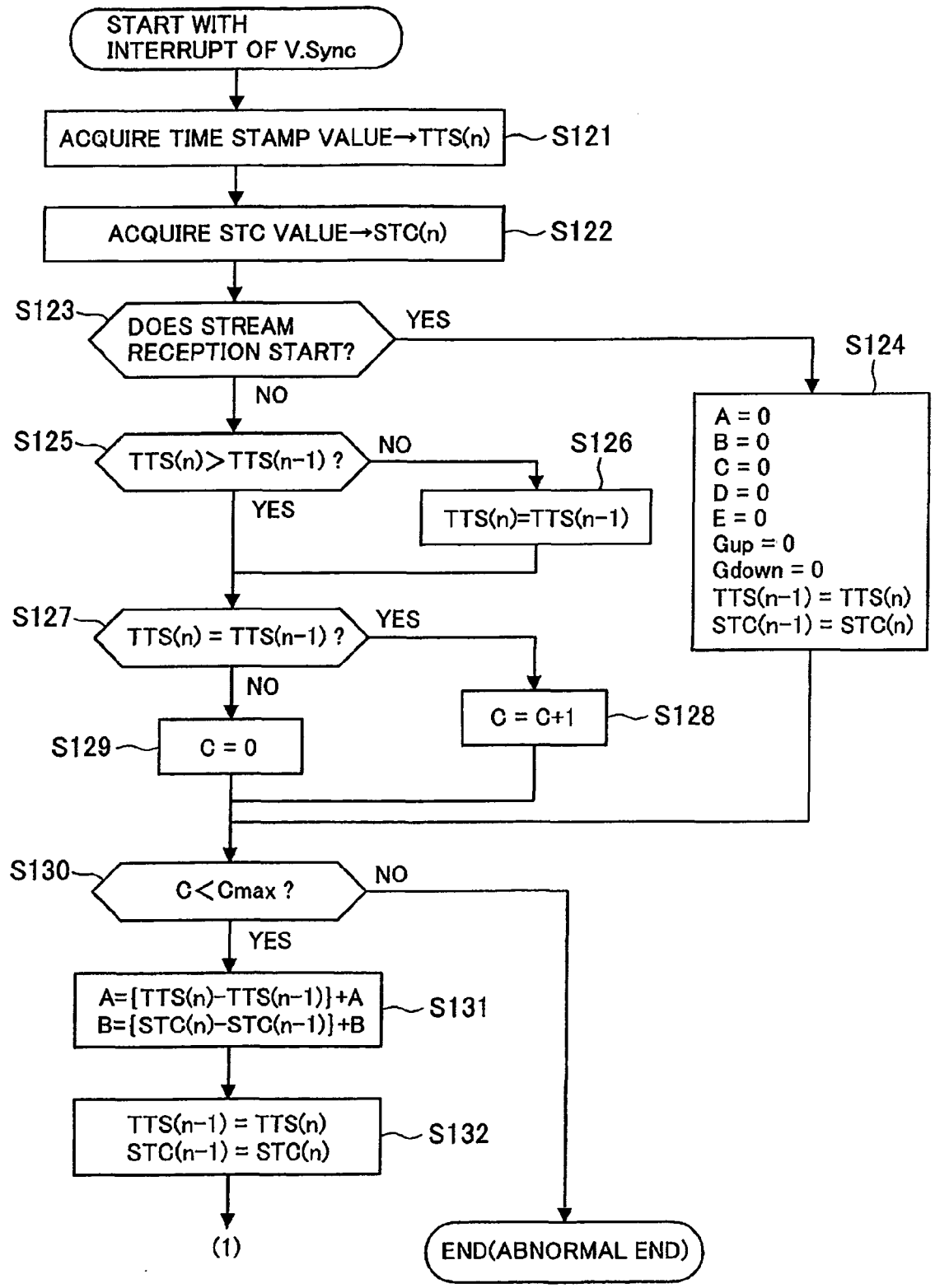
FIG. 5 is a flowchart illustrating a clock synchronous process using a receiving device 100 according to an embodiment of the present invention.
Figure 6:
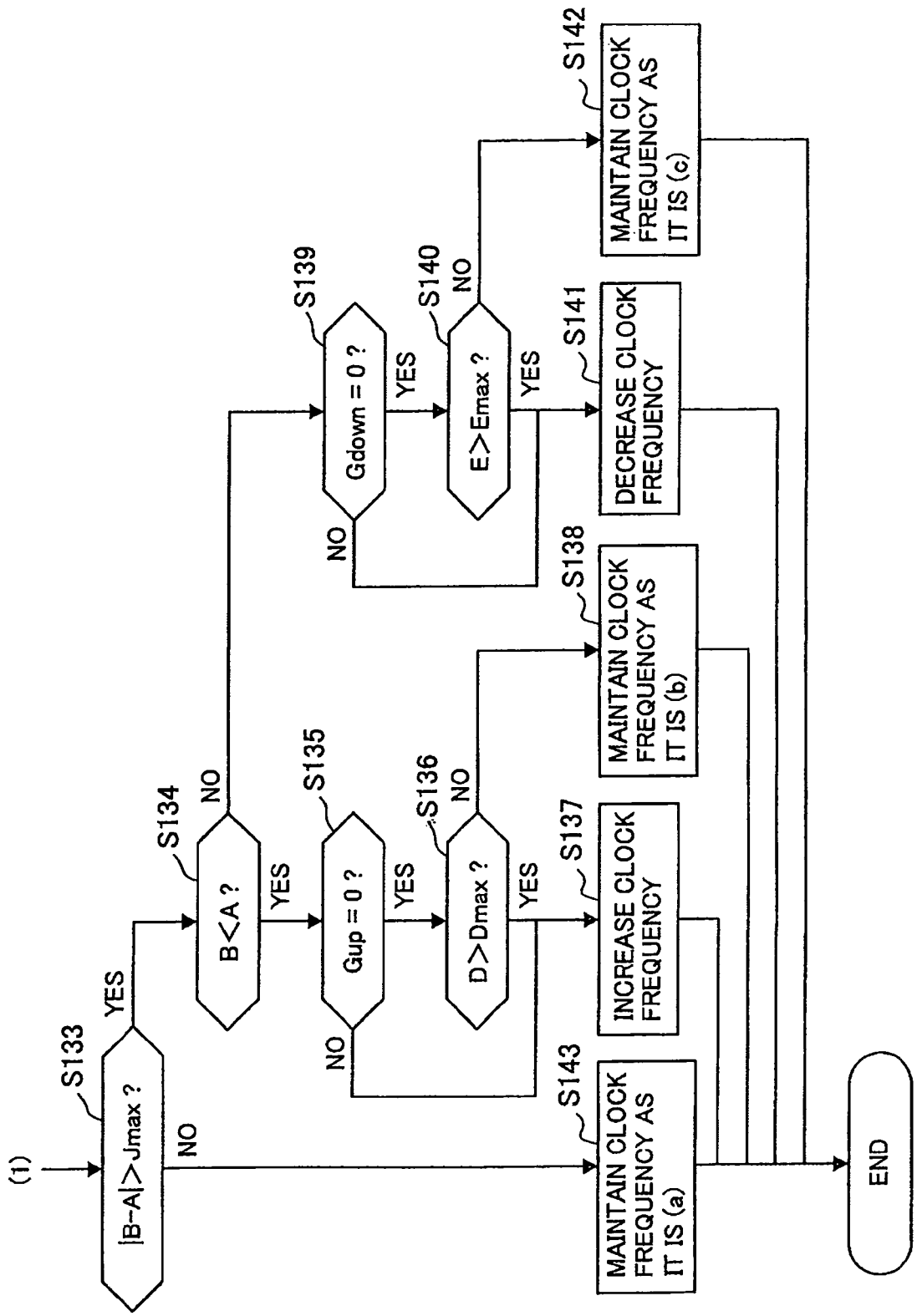
FIG. 6 is a flowchart illustrating a clock synchronous process using a receiving device 100 according to an embodiment of the present invention.

FIGS. 5 and 6 are flowcharts specifically illustrating a clock synchronous process using a receiving device 100 according to an embodiment of the present invention. FIG. 5 is a diagram corresponding to the processes from Step S101 to Step S107 in the flowchart shown in FIG. 3, and FIG. 6 is a diagram corresponding to the processes from Step S108 to Step S111 in the flowchart shown in FIG. 3. Hereinafter, the clock synchronous process according to the embodiment of the present invention will be described in detail using FIGS. 5 and 6.

As described above, the clock synchronous process in the receiving device 100 according to the embodiment of the present invention starts when interrupt of V. Sync from the AV synchronous control unit 125 to the CPU 131 is performed with a predetermined period. If the interrupt of V. Sync from the AV synchronous control unit 125 to the CPU 131 is performed, the CPU 131 acquires the newest time stamp value that is stored by the TS synchronous extracting unit 113 and stores the newest time stamp value in a variable TTS(n) (Step S121). Next, the CPU 131 acquires the newest STC counter value from the STC counter 119 and stores the newest STC counter value in the variable STC(n) (Step S122).

In this case, the CPU 131 acquires the newest STC counter value from the STC counter 119 after acquiring the newest time stamp value from the TS synchronous extracting unit 113, but the present invention is not limited thereto. The CPU 131 may acquire the newest time stamp value after acquiring the newest STC counter value or simultaneously acquire the two values. The following processes are assumed as processes that are executed by the CPU 131 as long as interrupt is not generated.

Next, the CPU 131 determines whether the reception of the packet stream starts (Step S123). As the determination result in Step S123, when the reception of the packet stream starts, the CPU 131 initializes the variables that are used during the clock synchronous process in the receiving device 100 (Step S124). Here, the variables that are used during the clock synchronous process in the receiving device 100 are described.

A: an accumulation value of time stamp values
B: an accumulation value of STC counter values
C: the number of times when a time stamp value is the same as the previous value
D: the number of times when a determination is continuously made as $A-B > J_{max}$
E: the number of times when a determination is continuously made as $B-A < J_{max}$
$G_{up}$: the number of times when it is needed to increase an oscillation frequency of the oscillator 127
$G_{down}$: the number of times when it is needed to decrease an oscillation frequency of the oscillator 127

Meanwhile, as the determination result in Step S123, when the reception of the packet stream does not start, the value that is stored in the variable TTS(n) is compared with the value that is stored in the variable TTS(n−1) that is stored in the immediately previous clock synchronous process (Step S125). When the value of the variable TTS(n) is not larger than the value of the variable TTS(n−1), this case corresponds to a case where the packet stream does not arrive or the packet arrival order is switched. As the comparison result, when the value of the variable TTS(n) is not larger than the value of the variable TTS(n−1), the value of the variable TTS(n−1) is stored in the variable TTS(n) (Step S126).

Next, it is determined whether the value stored in the variable TTS(n) is the same as the value stored in the variable TTS(n−1) (Step S127). As the determination result, when it is determined that the two values are the same, the value of the variable C is incremented by 1 (Step S128). In Step S126, when the value of the variable TTS(n) is not larger than the value of the variable TTS(n−1), the value of the variable TTS(n−1) is stored in the variable TTS(n). Accordingly, even when the time stamp value that is acquired in Step S121 is smaller than the previously acquired time stamp value, the value of the variable C is incremented by 1.

Meanwhile, when it is determined that the value stored in the variable TTS(n) is not the same as the value stored in the variable TTS(n−1), the value of the variable C is set as zero (Step S129).

Next, it is determined whether the value of the variable C is less than the predetermined threshold value $C_{max}$ (Step S130). As the predetermined threshold value $C_{max}$, a value corresponding to a predetermined time (for example, two seconds) is set. The variable C has a value of 2 or more, only when it is continuously determined in Step S127 that the value stored in the variable TTS(n) is the same as the value stored in the variable TTS(n−1). That is, when the value of the variable C is not less than the predetermined threshold value $C_{max}$, that is, when the time stamp value and the previous time stamp value are compared with each other and are continuously equal by $C_{max}$ times (continuously for a predetermined time), it is assumed that the packet stream is interrupted, and the clock synchronous process is abnormally completed.

Meanwhile, when the value of the variable C is less than the predetermined threshold value $C_{max}$, a calculation process is executed on the variables A and B (Step S131). A value that is obtained by subtracting the value of the variable TTS(n) by the value of the variable TTS(n−1) and adding the values of the variable A obtained until the corresponding point of time is substituted for the variable A. A value that is obtained by subtracting the value of the variable STC(n) by the value of the variable STC(n−1) and adding the values of the variable B obtained until the corresponding point of time is substituted for the variable B. When the time stamp value and the STC value are first acquired, the calculation is made as the variable TTS(n−1)=TTS(n) and the variable STC(n−1)=STC(n).

Next, to prepare for a next clock synchronous process, the value of the variable TTS(n) is stored in the variable TTS(n−1) and the value of the variable STC(n) is stored in the variable STC(n−1) (Step S132). The values may be stored in the variables TTS(n−1) and STC(n−1), respectively, after executing the largeness and smallness determining process between the variable A and the variable B that will be described below.

If the calculation of the variables A and B is performed, it is determined whether the absolute value (|B−A|) of the difference between the variables A and B is larger than the predetermined threshold value $J_{max}$ (Step S133). As the predetermined threshold value $J_{max}$, a value that corresponding to the considered maximum value of the network jitter is set.

Figure 7:
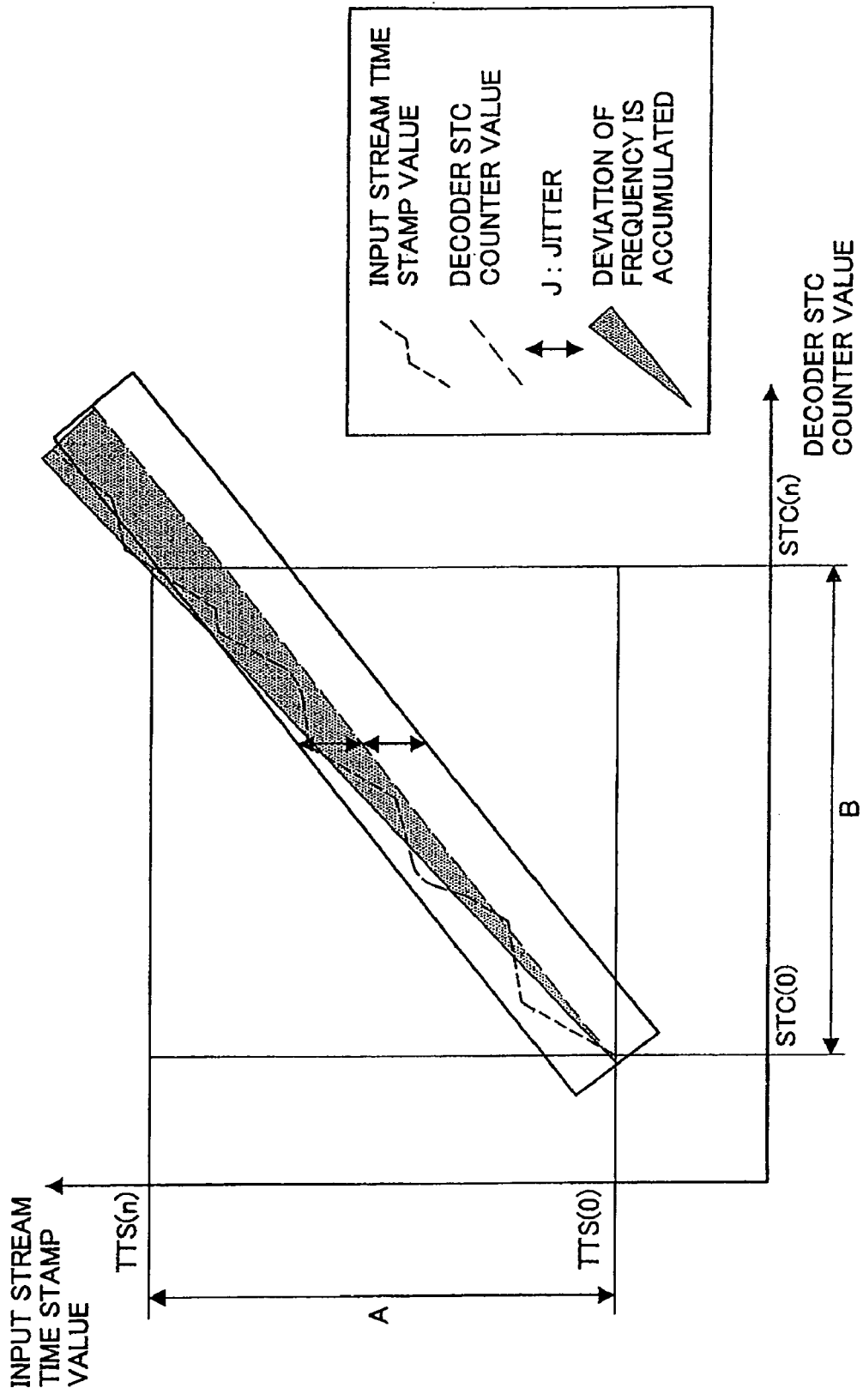
FIG. 7 is a graph illustrating a relationship between a difference of a time stamp value and an STC counter value and a jitter.

FIG. 7 is a graph illustrating a relationship between a difference of a time stamp value and an STC counter value and a jitter during a clock synchronous process using a receiving device 100 according to an embodiment of the present invention. In the graph that is shown in FIG. 7, a horizontal axis indicates an STC counter value and a vertical axis indicates a time stamp value. In addition, the variable A indicates values between the newest time stamp value TTS(n) and an initial value TTS (0) of a time stamp value, and the variable B indicates values between the newest STC counter value STC (n) and an initial value STC(0) of an STC counter value.

Since the oscillation frequency of the oscillator 127 is constant, the STC counter value increases at the same base. However, the time stamp value may not increase at the same base, and the increase base may vary depending on the network situation in the time stamp value. In addition, at any point of time, if a differential value between the time stamp value and the STC counter value exceeds a value that corresponds to the considered maximum value of the network jitter, it may not become possible to perform a stable decoding operation in the receiving device 100, which makes it difficult to stably perform a reproducing operation.

Accordingly, when the differential value between the time stamp value and the STC counter value exceeds the value that corresponds to the considered maximum value of the network jitter, the oscillation frequency is controlled to vary the increase base (that is, inclination of the graph shown in FIG. 7) of the STC counter value, and a control operation is performed such that the differential value between the time stamp value and the STC counter value becomes smaller than or equal to the considered maximum value of the network jitter. As such, if the oscillation frequency is controlled, the receiving device 100 can perform the stable decoding operation and reproducing operation.

As the determination result in Step S133, when the condition $|B-A| \leq J_{max}$ is satisfied, the oscillation frequency of the oscillator 127 is maintained as it is (Step S143), and a process is completed. Meanwhile, when the condition $|B-A| > J_{max}$ is satisfied, it is determined whether the condition B<A is satisfied (that is, whether the time stamp value increases preceding the STC counter value) (Step S134).

As the determination result in Step S134, when the condition B<A is satisfied, it is determined whether the condition $G_{up}=0$ is satisfied (Step S135). As described above, the variable $G_{up}$ is the number of times when it is needed to increase the oscillation frequency of the oscillator 127. The function of the variable $G_{up}$ will be described in detail below. As the determination result in Step S135, when the condition $G_{up}=0$ is satisfied, it is determined whether the variable D is larger than the predetermined threshold value $D_{max}$ (Step S136). In this case, $D_{max}$ is an integer of 1 or more. When the variable D is larger than the predetermined threshold value $D_{max}$, the control operation is performed to increase the oscillation frequency of the oscillator 127 (Step S137). Meanwhile, when the variable D is not larger than the predetermined threshold value $D_{max}$, the oscillation frequency of the oscillator 127 does not vary (Step S138).

As described above, the variable D indicates the number of times when a determination is continuously made as $A-B>J_{max}$. Accordingly, in Step S134, a determination is continuously made plural times as B<A, and the oscillation frequency of the oscillator 127 is first controlled to be increased.

Further, as the determination result in Step S134, when the condition A<B is satisfied, it is determined whether the condition $G_{down}=0$ is satisfied (Step S139). As described above, the variable $G_{down}$ is the number of times when it is needed to decrease the oscillation frequency of the oscillator 127. The function of the variable $G_{down}$ will be described in detail below. As the determination result in Step S139, when the condition $G_{down}=0$ is satisfied, it is determined whether the variable E is larger than the predetermined threshold value $E_{max}$ (Step S140). In this case, $E_{max}$ is an integer of 1 or more. When the variable E is larger than the predetermined threshold value $E_{max}$, the control operation is performed to decrease the oscillation frequency of the oscillator 127 (Step S141). Meanwhile, when the variable E is not larger than the predetermined threshold value $E_{max}$, the oscillation frequency of the oscillator 127 does not vary (Step S142).

As described above, the variable E indicates the number of times when a determination is continuously made as $B-A>J_{max}$. Accordingly, in Step S134, a determination is continuously made plural times as A>B, and the oscillation frequency of the oscillator 127 is first controlled to be decreased.

As such, the CPU 131 controls the oscillation frequency of the oscillator 127 by determining whether to increase, decrease, or maintain the oscillation frequency of the oscillator 127, thereby completing a series of clock synchronous processes. Hereinafter, the CPU 131 executes the processes shown in FIGS. 5 and 6 whenever interrupt of V. Sync from the AV synchronous control unit 125 is received, thereby controlling the oscillation frequency of the oscillator 127.

In this case, the individual processes of Steps S137, S138, S141, S142, and S143 will be described in detail.

Figure 8:
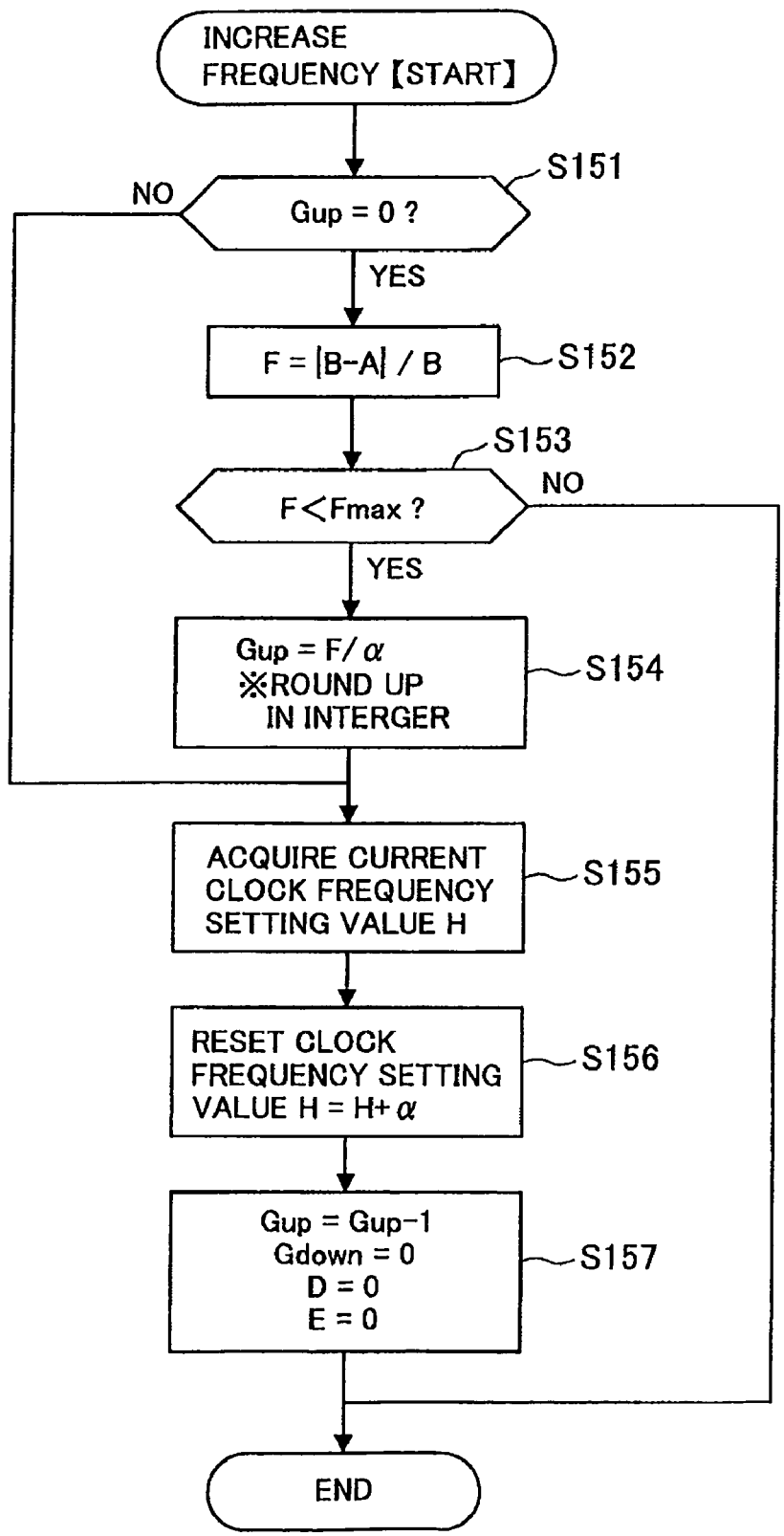
FIG. 8 is a flowchart specifically illustrating a process of increasing an oscillation frequency of an oscillator.

FIG. 8 is a flowchart specifically illustrating a process of increasing an oscillation frequency of an oscillator 127 that is shown in Step S137 of FIG. 6, in a clock synchronous process using a receiving device 100 according to an embodiment of the present invention.

When the oscillation frequency of the oscillator 127 is increased, first, it is determined whether the value of the variable $G_{up}$ is $G_{up}=0$ (Step S151). If the value of the variable $G_{up}$ is $G_{up}=0$, a value that is obtained by dividing |B-A| by B is calculated, and the calculation result is stored in the variable F (Step S152). The variable F corresponds to a deviation of a clock between a transmission side and the receiving device 100, which analogically reasons from a passage time until a determination is made as $A-B>J_{max}$ and a difference between the values A and B. For example, if the value of the variable B is a value corresponding to 60 minutes and a value of (A−B) is a value corresponding to 180 milliseconds, the variable F becomes have a value that corresponds to 50 ppm.

If the value is completely stored in the variable F, it is determined whether the value of the variable F is less than the predetermined threshold value $F_{max}$ (Step S153). As the predetermined threshold value $F_{max}$, a value that significantly exceeds a variable range of the oscillation frequency of the oscillator 127 is desirably set. As an example of the predetermined threshold value $F_{max}$, 100 ppm (corresponding to 2700 Hz) may be set. As the determination result in Step S153, when it is determined that the condition $F<F_{max}$ is not satisfied, it is assumed as an abnormal state and all of the following processes are skipped. Meanwhile, as the determination result in Step S153, when it is determined that the condition $F<F_{max}$ is satisfied, a value that is obtained by dividing the variable F by a setting variation value α is stored in the variable $G_{up}$ (Step S154). As the result that is obtained by dividing the variable F by the setting variation value α, if the variable F is not completely divided, the numbers to decimal places are rounded off.

The setting variation value α indicates a variation value of the oscillation frequency of the oscillator 127, when a one-time clock synchronous process is executed. For example, when the setting variation value α is set as 5 ppm (corresponding to 135 Hz), if the value of the variable F is a value that corresponds to 50 ppm, the value of the variable $G_{up}$ becomes 50/5=10. That is, in this case, the oscillation frequency of the oscillator 127 is changed ten times until the oscillation frequency becomes a target oscillation frequency. If the oscillation frequency is changed once by the large amount, a disturbance may occur in an image or a sound when the received packet stream is decoded. For this reason, in this embodiment, in order to prevent the disturbance from occurring in the image or the sound, the oscillation frequency is gradually changed.

In Step S151, when it is determined that the value of the variable $G_{up}$ is not $G_{up}=0$, the processes from Step S152 to Step S154 are skipped.

Next, a setting value H of a current clock frequency that is oscillated by the oscillator 127 is acquired (Step S155). If the setting value H of the current clock frequency that is oscillated by the oscillator 127 is acquired, the setting variation value a is added to the setting value H, and the setting value of the clock frequency that is oscillated by the oscillator 127 is set again (Step S156). Specifically, when the VCXO is used in the oscillator 127, the clock frequency that is oscillated by the oscillator 127 is changed by controlling the PWM signal that is supplied to the VCXO.

If the setting value of the clock frequency that is oscillated by the oscillator 127 is set again in Step S156, the value of the variable $G_{up}$ is decremented by 1, and the values of the variables $G_{down}$, D, and E are initialized to 0 (Step S157).

Figure 9:
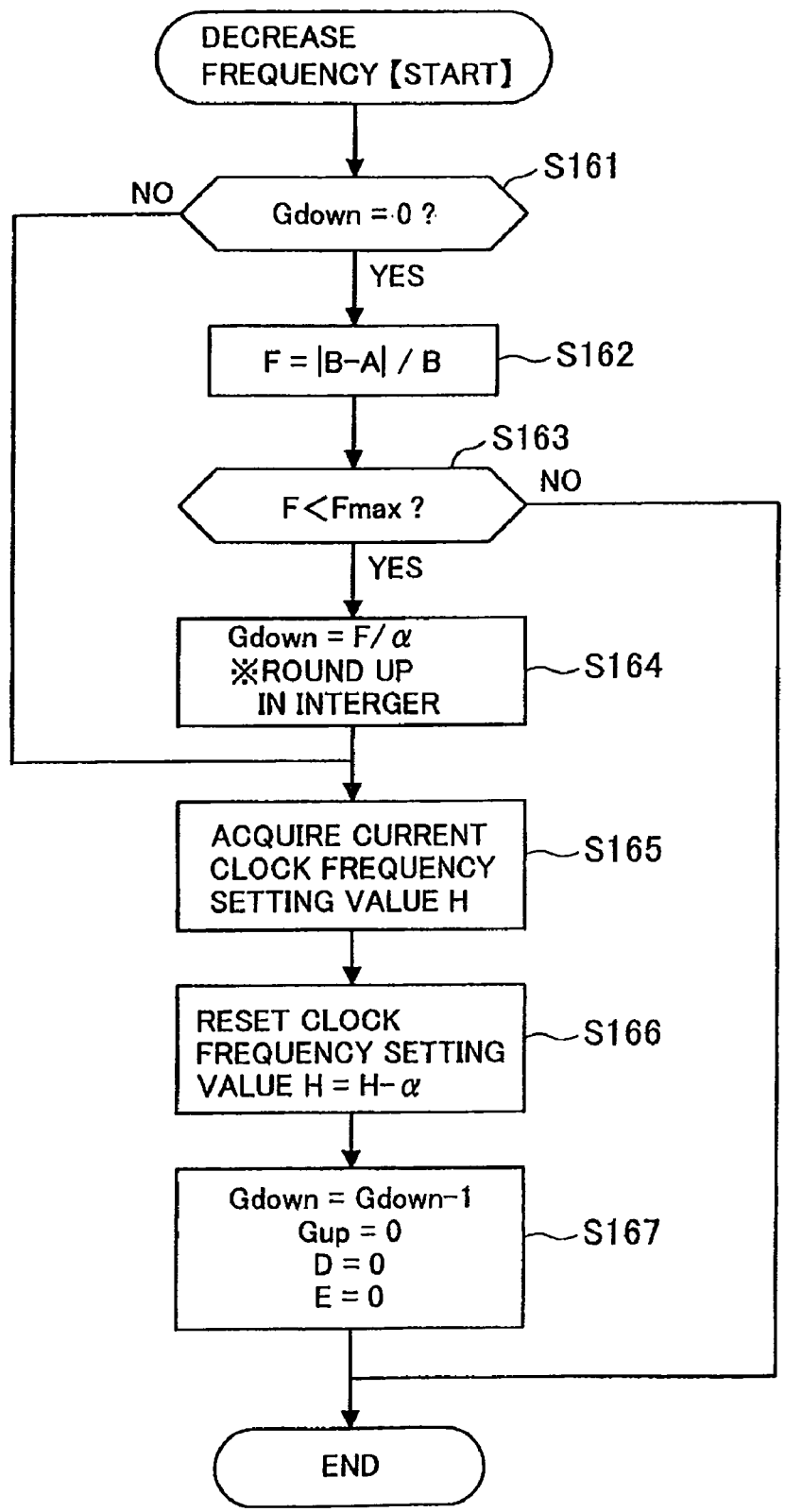
FIG. 9 is a flowchart specifically illustrating a process of decreasing an oscillation frequency of an oscillator.

FIG. 9 is a flowchart specifically illustrating a process of decreasing an oscillation frequency of an oscillator 127 that is shown in Step S141 of FIG. 6, in a clock synchronous process using a receiving device 100 according to an embodiment of the present invention.

When the oscillation frequency of the oscillator 127 is decreased, first, it is determined whether the value of the variable $G_{down}$ is $G_{down}=0$ (Step S161). If the value of the variable $G_{down}$ is $G_{down}=0$, a value that is obtained by dividing |B−A| by B is calculated, and the calculation result is stored in the variable F (Step S162). The variable F corresponds to a deviation of a clock between a transmission side and the receiving device 100, which analogically reasons from a passage time until a determination is made as $B-A>J_{max}$ and a difference between the values A and B.

If the value is completely stored in the variable F, it is determined whether the value of the variable F is less than the predetermined threshold value $F_{max}$ (Step S163). As the determination result in Step S163, when it is determined that the condition $F<F_{max}$ is not satisfied, it is assumed as an abnormal state and all of the following processes are skipped. Meanwhile, as the determination result in Step S163, when it is determined that the condition $F<F_{max}$ is satisfied, a value that is obtained by dividing the variable F by a setting variation value α is stored in the variable $G_{down}$ (Step S164).

In Step S161, when it is determined that the value of the variable $G_{down}$ is not $G_{down}=0$, the processes from Step S162 to Step S164 are skipped.

Next, a setting value H of a current clock frequency that is oscillated by the oscillator 127 is acquired (Step S165). If the setting value H of the current clock frequency that is oscillated by the oscillator 127 is acquired, the setting value of the clock frequency that is oscillated by the oscillator 127 is set again by subtracting the setting variation value α from the setting value H (Step S166).

If the setting value of the clock frequency that is oscillated by the oscillator 127 is set again in Step S166, the value of the variable $G_{down}$ is decremented by 1, and the values of the variables $G_{up}$, D, and E are initialized to 0 (Step S167).

Figure 10:
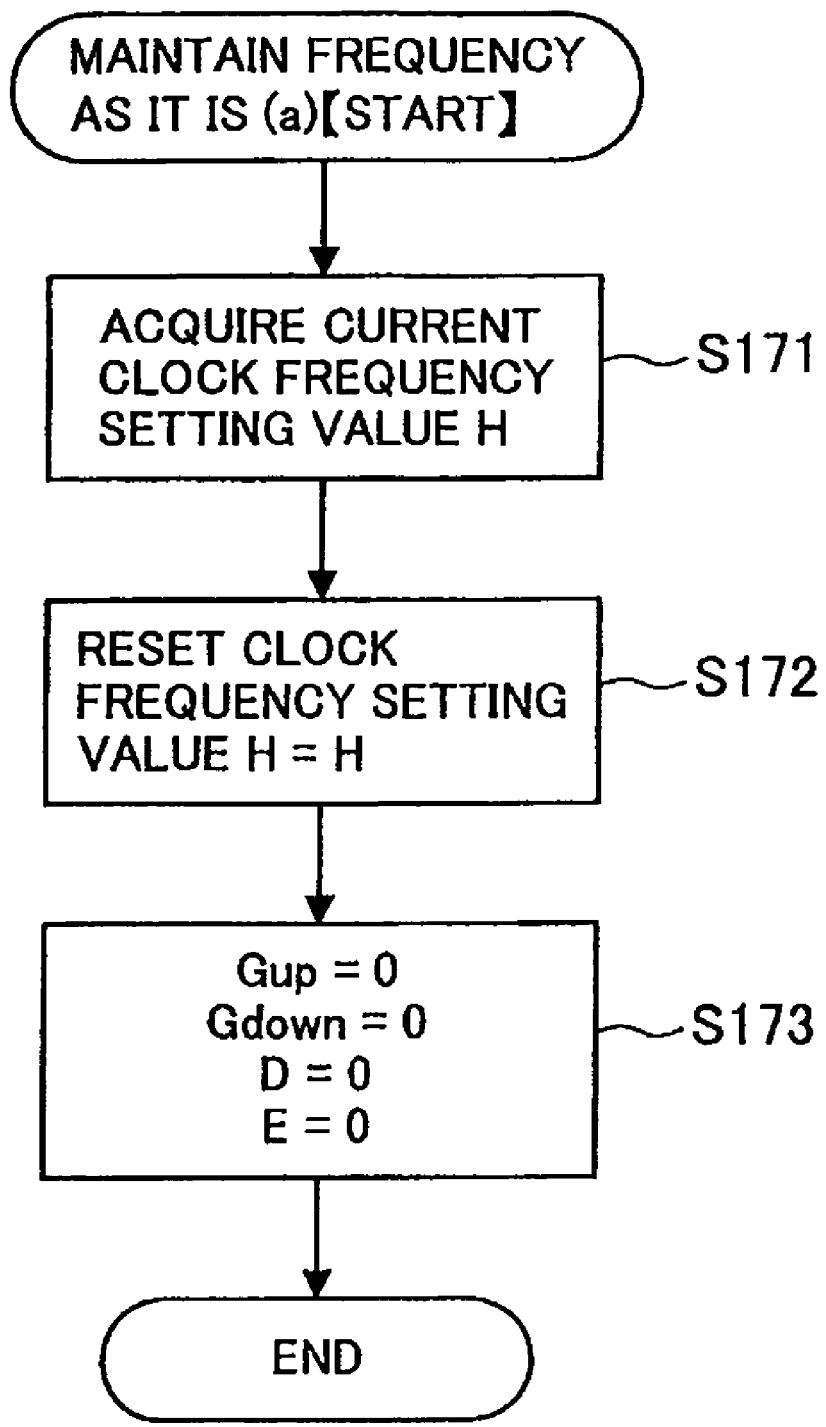
FIG. 10 is a flowchart specifically illustrating a process of maintaining an oscillation frequency of an oscillator as it is.

FIG. 10 is a flowchart specifically illustrating a process of maintaining, as it is, an oscillation frequency of an oscillator 127 that is shown in Step S143 of FIG. 6, in a clock synchronous process using a receiving device 100 according to an embodiment of the present invention.

First, a setting value H of a current clock frequency that is oscillated by the oscillator 127 is acquired (Step S171). If the setting value H of the current clock frequency that is oscillated by the oscillator 127 is acquired, the acquired setting value H is set again as the setting value of the clock frequency that is oscillated by the oscillator 127 (Step S172).

If the setting value of the clock frequency that is oscillated by the oscillator 127 is set again in Step S172, the values of the variables $G_{up}$, $G_{down}$, D, and E are initialized to 0 (Step S173).

In Step S143 of FIG. 6, since the current clock frequency that is oscillated by the oscillator 127 is not changed, the processes that correspond to Steps S171 and S172 may not be executed.

Figure 11:
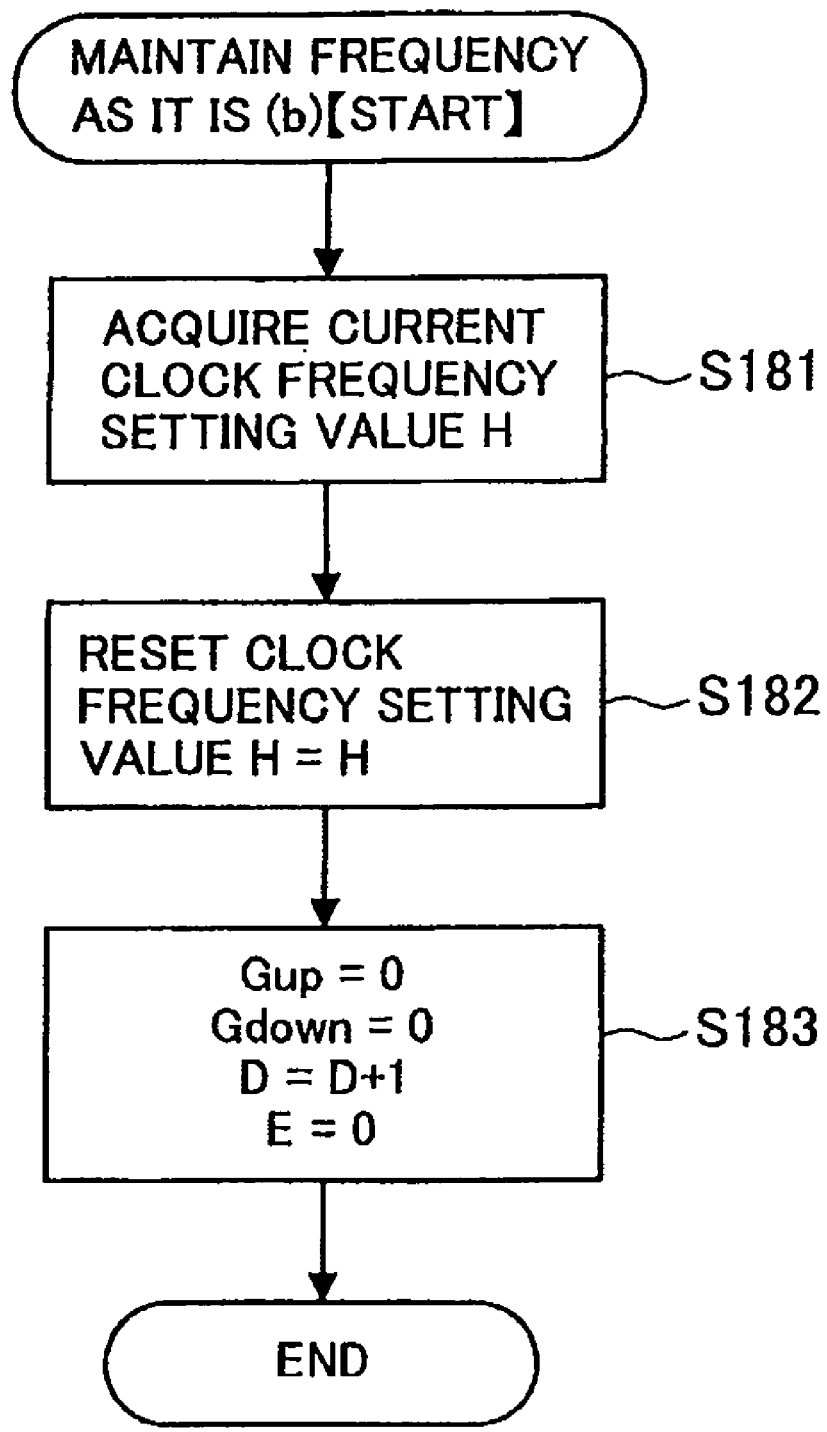
FIG. 11 is a flowchart specifically illustrating a process of maintaining an oscillation frequency of an oscillator as it is.

FIG. 11 is a flowchart specifically illustrating a process of maintaining, as it is, an oscillation frequency of an oscillator 127 that is shown in Step S138 of FIG. 6, in a clock synchronous process using a receiving device 100 according to an embodiment of the present invention.

First, a setting value H of a current clock frequency that is oscillated by the oscillator 127 is acquired (Step S181). If the setting value H of the current clock frequency that is oscillated by the oscillator 127 is acquired, the acquired setting value H is set again as the setting value of the clock frequency that is oscillated by the oscillator 127 (Step S182).

If the setting value of the clock frequency that is oscillated by the oscillator 127 is set again in Step S182, the values of the variables $G_{up}$, $G_{down}$, and E are initialized to 0, and the value of the variable D is incremented by 1 (Step S183). Since Step S138 of FIG. 6 corresponds to a process that is executed when it is determined in Step S134 that the condition B<A is satisfied, the variable D, which indicates the number of times when it is continuously determined that the condition $A-B>J_{max}$ is satisfied, is incremented by 1. In this case, when the value of the variable D increases and becomes larger than the predetermined threshold value $D_{max}$ in Step S136 of FIG. 6, it is possible to execute a process of increasing a clock frequency that is oscillated by the oscillator 127 in Step S137.

In Step S138 of FIG. 6, since the current clock frequency that is oscillated by the oscillator 127 is not changed, the processes that correspond to Steps S181 and S182 may not be executed.

Figure 12:
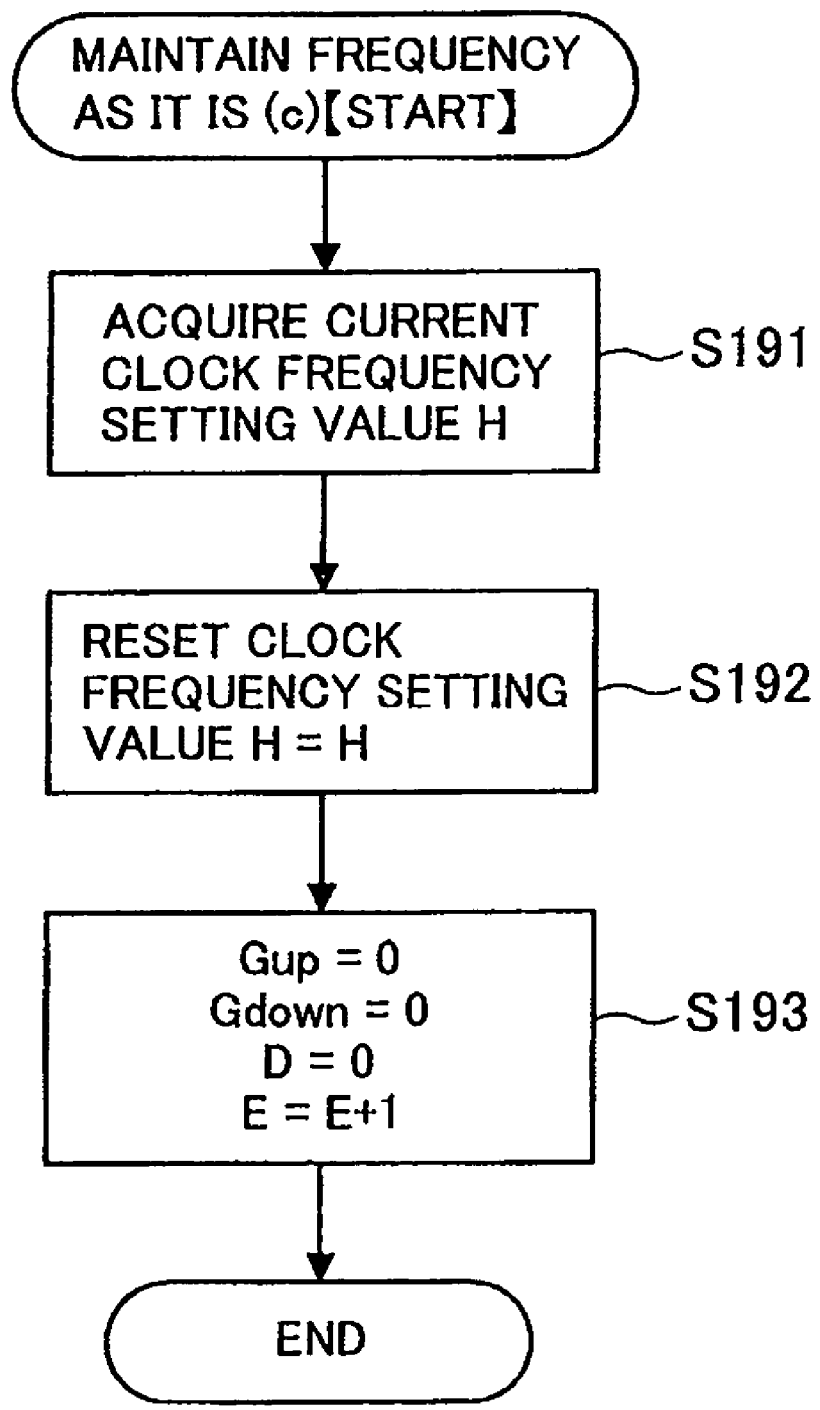
FIG. 12 is a flowchart specifically illustrating a process of maintaining an oscillation frequency of an oscillator as it is.

FIG. 12 is a flowchart specifically illustrating a process of maintaining, as it is, an oscillation frequency of an oscillator 127 that is shown in Step S142 of FIG. 6, in a clock synchronous process using a receiving device 100 according to an embodiment of the present invention.

First, a setting value H of a current clock frequency that is oscillated by the oscillator 127 is acquired (Step S191). If the setting value H of the current clock frequency that is oscillated by the oscillator 127 is acquired, the acquired setting value H is set again as the setting value of the clock frequency that is oscillated by the oscillator 127 (Step S192).

If the setting value of the clock frequency that is oscillated by the oscillator 127 is set again in Step S192, the values of the variables $G_{up}$, $G_{down}$, and D are initialized to 0, and the value of the variable E is incremented by 1 (Step S193). Since Step S142 of FIG. 6 corresponds to a process that is executed when it is determined in Step S134 that the condition B>A is satisfied, the variable E, which indicates the number of times when it is continuously determined that the condition $B-A>J_{max}$ is satisfied, is incremented by 1. In this case, when the value of the variable E increases and becomes larger than the predetermined threshold value $E_{max}$ in Step S140 of FIG. 6, it is possible to execute a process of decreasing a clock frequency that is oscillated by the oscillator 127 in Step S141.

In Step S142 of FIG. 6, since the current clock frequency that is oscillated by the oscillator 127 is not changed, the processes that correspond to Steps S191 and S192 may not be executed.

The clock synchronous process using the receiving device 100 according to the embodiment of the present invention has been described.

The audio decoder 123 and the video decoder 124 operate at the oscillation frequency of the oscillator 127 that is controlled in the above-described way. At this time, the supply of the packet stream from the TS synchronous extracting unit 113 to the audio decoder 123 and the video decoder 124 can be performed by matching the count value of the TS synchronous clock counter and the time stamp, as described in Patent Document 1. In addition, if the TS synchronous clock counter is not used and a space exists in the audio decoder buffer 117 or the video decoder buffer 118, the TS synchronous extracting unit 113 is requested to transmit data and the data is supplied to the audio decoder 123 and the video decoder 124. As a result, the received video data or audio data can be reproduced.

As described above, according to this embodiment, in a system that does not perform flow control at an RTP/UDP transmission, in the receiving device 100, if the oscillation frequency of the oscillator 127 of the receiving device 100 is controlled in consideration of the network jitter, it is possible to stably decode the packet stream received through the network over a long period of time. In addition, in the system that decodes the packet stream received through the network to reproduce the packet stream, encodes the video or the audio again, multiplexes and records the video or the audio, a disturbance of an image that occurs when the buffer is broken may be recorded as it is. Accordingly, if the oscillation frequency of the oscillator 127 of the receiving device 100 is controlled in consideration of the network jitter, it is not likely for the buffer to be broken, and the frequency of the disturbance of the image occurring in the recorded video is reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving device comprising:
a receiving unit that receives a packet stream where predetermined units each having at least a time stamp and a TS (Transport Stream) packet are continuous;
an oscillator that can control an oscillation frequency;
a measuring unit that divides a clock supplied by the oscillator and performs a measuring operation;
an acquiring unit that reads the newest time stamp read from the packet stream received by the receiving unit and the newest measurement value measured by the measuring unit with a predetermined period, from a point of time when the packet stream starts to be received;
a calculating unit that calculates an accumulation value of the time stamps acquired by the acquiring unit and an accumulation value of the measurement values acquired by the acquiring unit;
a comparing unit that compares an absolute value of a difference between the accumulation value of the time stamps calculated by the calculating unit and the accumulation value of the measurement values calculated by the calculating unit, and a value corresponding to a network jitter;
a frequency control unit that controls the oscillation frequency of the oscillator, when the absolute value of the difference between the accumulation value of the time stamps and the accumulation value of the measurement values is larger than the value corresponding to the network jitter as the comparison result by the comparing unit; and
a processing unit compare the newest time stamp read by the acquiring unit with an immediately previous time stamp read by the acquiring unit to (i) determine if an arrival order of the packet stream is normal or abnormal such that if a comparison result thereof indicates that the newest time stamp is smaller than the immediately previous time stamp the arrival order of the packet stream is determined to be abnormal whereupon a correction process is executed, and if the comparison result indicates that the newest time stamp is not smaller than the immediately previous time stamp the arrival order of the packet stream is determined to be normal whereupon the correction process is skipped, and (ii) determine, when the arrival order is determined to be normal or after completion of the correction process, if the packet stream has been interrupted or not interrupted such that when the comparison result indicates that the newest time stamp is the same as the immediately previous time stamp the packet stream is determined to have been interrupted whereupon the frequency control unit does not control the oscillation frequency and when the comparison result indicates that the newest time stamp is not the same as the immediately previous time stamp the packet stream is determined to have not been interrupted whereupon the calculating unit calculates the accumulation value of the time stamps and the accumulation value of the measurement values and the comparing unit compares the absolute value of the difference and the value corresponding to the network jitter.

2. The receiving device according to claim 1,
wherein the frequency control unit controls the oscillation frequency of the oscillator using a ratio between a time until the absolute value and the value are compared with each other from a point of time when the receiving unit starts to receive the packet stream, and a difference of the time stamp and the measurement value.

3. The receiving device according to claim 1, further comprising
a reproducing unit that decodes and reproduces the TS packet, which is included in the packet stream received by the receiving unit, in synchronization with the clock that is controlled by the frequency control unit and supplied from the oscillator.

4. The receiving device according to claim 1,
wherein the calculating unit uses the immediately previously read time stamp for calculating the accumulation value, when the immediately previously read time stamp is smaller than the newest time stamp.

5. The receiving device according to claim 1,
wherein, when the comparing unit determines that the absolute value of the difference between the accumulation value of the time stamps and the accumulation value of the measurement values is larger than the value corresponding to the network jitter, the frequency control unit first controls the oscillation frequency of the oscillator, when either the accumulation value of the time stamps or the accumulation value of the measurement values is continuously large over the predetermined number of times.

6. A clock synchronizing method comprising the steps of:
receiving a packet stream where predetermined units each having at least a time stamp and a TS packet are continuous;
supplying a clock having a controllable oscillation frequency;
dividing the supplied clock and performing a measuring operation;
reading the newest time stamp read from the received packet stream and the measured newest measurement value with a predetermined period, from a point of time when the packet stream starts to be received;
calculating an accumulation value of the acquired time stamps and an accumulation value of the acquired measurement values;
comparing an absolute value of a difference between the calculated accumulation value of the time stamps and the calculated accumulation value of the measurement values, and a value corresponding to a network jitter;
controlling the oscillation frequency of the supplied clock, when the absolute value of the difference between the accumulation value of the time stamps and the accumulation value of the measurement values is larger than the value corresponding to the network jitter as the comparison result; and
comparing the newest read time stamp with an immediately previous read time stamp to (i) determine if an arrival order of packet stream is normal or abnormal such that if a comparison result thereof indicates that the newest time stamp is smaller than the immediately previous time stamp the arrival order of the packet stream is determined to be abnormal whereupon a correction process is executed and if the comparison result indicates that the newest time stamp is not smaller than the immediately previous time stamp the arrival order of the packet stream is determined to be normal whereupon the correction process is skipped, and (ii) determine, when the arrival order is determined to be normal or after completion of the correction process, if the packet stream has been interrupted or not interrupted such that when the comparison result indicates that the newest time stamp is the same as the immediately previous time stamp the packet stream is determined to have been interrupted whereupon the oscillation frequency is not controlled and when the comparison result indicates that the newest time stamp is not the same as the immediately previous time stamp the packet stream is determined to have not been interrupted whereupon the calculating of the accumulation value of the time stamps and the accumulation value of the measurement values and the comparing of the absolute value of the difference and the value corresponding to the network jitter are performed.

7. A non-transitory computer readable storage medium having stored thereon a computer program that allows a computer to execute processes including the steps of: receiving a packet stream where predetermined units each having at least a time stamp and a TS packet are continuous; supplying a clock having a controllable oscillation frequency; dividing the supplied clock and performing a measuring operation; reading the newest time stamp read from the received packet stream and the measured newest measurement value with a predetermined period, from a point of time when the packet stream starts to be received; calculating an accumulation value of the acquired time stamps and an accumulation value of the acquired measurement values; comparing an absolute value of a difference between the calculated accumulation value of the time stamps and the calculated accumulation value of the measurement values, and a value corresponding to a network jitter; controlling the oscillation frequency of the supplied clock, when the absolute value of the difference between the accumulation value of the time stamps and the accumulation value of the measurement values is larger than the value corresponding to the network jitter as the comparison result; and comparing the newest read time stamp with an immediately previous read time stamp to (i) determine if an arrival order of the packet stream is normal or abnormal such that if a comparison result thereof indicates that the newest time stamp is smaller than the immediately previous time stamp the arrival order of the packet stream is determined to be abnormal whereupon a correction process is executed, and if the comparison result indicates that the newest time stamp is not smaller than the immediately previous time stamp the arrival order of the packet stream is determined to be normal whereupon the correction process is skipped, and (ii) determine, when the arrival order is determined to be normal or after completion of the correction process, if the packet stream has been interrupted or not interrupted such that when the comparison result indicates that the newest time stamp is the same as the immediately previous time stamp the packet stream is determined to have been interrupted whereupon the oscillation frequency is not controlled and when the comparison result indicates that the newest time stamp is not the same as the immediately previous time stamp the packet stream is determined to have not been interrupted whereupon the calculating of the accumulation value of the time stamps and the accumulation value of the measurement values and the comparing of the absolute value of the difference and the value corresponding to the network jitter are performed.

* * * * *